(12) United States Patent
Kamp et al.

(10) Patent No.: US 10,779,649 B2
(45) Date of Patent: Sep. 22, 2020

(54) EQUIPMENT LEG

(71) Applicant: Component Hardware Group, Inc., Lakewood, NJ (US)

(72) Inventors: Andrew Kamp, Shrewsbury, NJ (US); Brion Gompper, Lakewood, NJ (US)

(73) Assignee: COMPONENT HARDWARE GROUP, INC., Lakewood, NJ (US)

( * ) Notice: Subject to any disclaimer, the term of this patent is extended or adjusted under 35 U.S.C. 154(b) by 0 days.

(21) Appl. No.: 16/241,470

(22) Filed: Jan. 7, 2019

(65) Prior Publication Data
US 2019/0208906 A1     Jul. 11, 2019

Related U.S. Application Data

(60) Provisional application No. 62/614,617, filed on Jan. 8, 2018.

(51) Int. Cl.
| | |
|---|---|
| *A47B 91/02* | (2006.01) |
| *A47B 9/04* | (2006.01) |
| *F16M 11/32* | (2006.01) |
| *F16B 12/10* | (2006.01) |

(52) U.S. Cl.
CPC ............. *A47B 91/026* (2013.01); *A47B 9/04* (2013.01); *A47B 91/024* (2013.01); *A47B 91/028* (2013.01); *F16M 11/32* (2013.01); *A47B 2220/003* (2013.01); *F16B 12/10* (2013.01)

(58) Field of Classification Search
CPC ....... A47B 91/026; A47B 9/04; A47B 91/028; A47B 91/024; A47B 2220/003; F16M 11/32; F16M 7/00; F16B 12/10

USPC ................... 248/188.4, 188.8, 440, 502, 677
See application file for complete search history.

(56) References Cited

U.S. PATENT DOCUMENTS

| | | | | |
|---|---|---|---|---|
| 3,758,058 | A * | 9/1973 | Neudeck | F16F 15/067 410/46 |
| 5,791,612 | A * | 8/1998 | King | A47B 91/026 248/188.2 |
| 7,159,829 | B1 * | 1/2007 | Finkelstein | B60B 33/04 108/144.11 |
| 7,597,294 | B2 * | 10/2009 | Lotz | F16M 7/00 182/200 |
| 8,220,760 | B2 * | 7/2012 | Fetzer | A47B 91/028 248/188.4 |
| 2005/0116134 | A1 * | 6/2005 | Lee | D06F 39/125 248/650 |
| 2007/0102618 | A1 * | 5/2007 | Hunke | D06F 39/12 248/673 |
| 2008/0028803 | A1 * | 2/2008 | Lee | D06F 39/125 68/23.1 |
| 2011/0198478 | A1 * | 8/2011 | Chang | F16M 7/00 248/670 |
| 2013/0313385 | A1 * | 11/2013 | Mora | D06F 39/125 248/188.4 |

(Continued)

*Primary Examiner* — Muhammad Ijaz
(74) *Attorney, Agent, or Firm* — Francis C. Hand; Carella Byrne, et al

(57) ABSTRACT

The adjustable equipment leg comprises a housing assembly for mounting within a piece of equipment and a toe assembly mounted on the housing assembly for vertical adjustment for raising and lowering the piece of equipment. The piece of equipment is constructed with a floor and the housing assembly is disposed on the floor within the piece of equipment thereby being hidden from view.

6 Claims, 2 Drawing Sheets

(56) References Cited

U.S. PATENT DOCUMENTS

| | | | |
|---|---|---|---|
| 2016/0081474 A1* | 3/2016 | Basesme | A47L 15/4253 |
| | | | 248/188.4 |
| 2017/0245640 A1* | 8/2017 | Cheng | F16B 7/182 |
| 2018/0271276 A1* | 9/2018 | Chartrand | A47B 91/024 |
| 2019/0208906 A1* | 7/2019 | Kamp | A47B 9/04 |

* cited by examiner

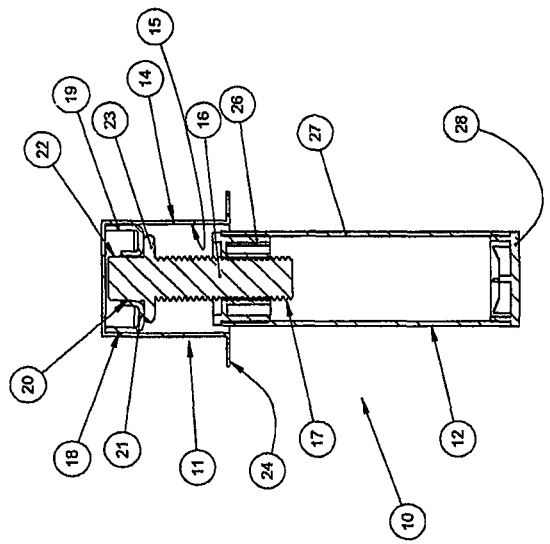
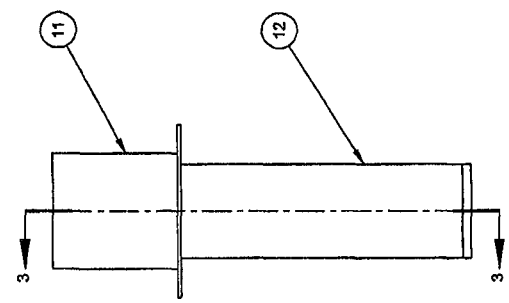
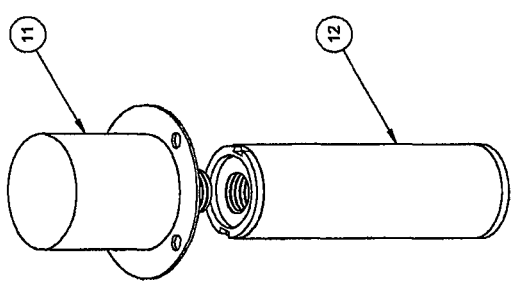

EQUIPMENT LEG

This is a Non-Provisional patent application and claims the benefit of Provisional Patent Application 62/614,617 filed Jan. 8, 2018.

As is known, adjustable equipment legs have been widely used in various industries to add variable height to any applicable piece of equipment. Typically, these legs have an adjustable "toe" and a housing into which the toe will move in and out. The housing is typically mounted to the equipment and stays fixed, relative to the equipment, while the toe will move vertically with respect to the housing.

In many cases, the housings of the equipment leg assemblies are rigidly connected to the equipment on the exterior. Such a housing is exposed and will have a toe that moves vertically in and out of the housing via either a threaded connection or a pin connection. This is what gives the equipment leg its height adjustability. These leg assemblies will have two different diameters for the toe and housing, thus giving the assembly a non-uniform profile.

Accordingly, it is an object of the invention to provide an improved mounting arrangement for an equipment leg.

It is another object of the invention to improve the aesthetics of an adjustable leg for supporting equipment.

Briefly, the invention provides an adjustable equipment leg that is mounted inside the equipment rather than outside, giving the leg a unique, uniform, cylindrical profile when mounted and viewed from the exterior.

The adjustable equipment leg comprises a housing assembly configured for within a piece of equipment and a toe assembly mounted on the housing assembly for vertical adjustment for raising and lowering the piece of equipment.

The housing assembly includes a housing, for example, of steel tubing, having a cylindrical chamber, a stud concentrically disposed in and having an externally threaded end projecting from said housing and a retainer ring concentric to the stud and securing the stud within the housing.

The retainer ring has an outer wall slidably mounted in the housing, an inner wall slidably engaging the stud and a planar wall connecting the outer wall and the inner wall. The retainer ring is made of metal and is fitted into the housing such that the outer wall frictionally engages the inside of the housing with sufficient force to prevent the ring from falling out of the housing. In addition, the retainer rig is also secured by welding the retainer ring to the housing.

The stud, typically made of metal, has a knurled outer surface at an end that is fitted into the retainer ring such that the inner wall of the ring engages the end of the stud with sufficient force to prevent the stud from being inadvertently pulled out of the ring and the housing assembly. In addition, the stud is also secured by welding the stud to the retainer ring.

The stud also has a collar that extends intermediately thereof and in abutment with the planar wall of the retainer ring. This collar allows the height of the press fit to be controlled and increase the load capacity of the stud.

The piece of equipment is constructed with a floor and the housing assembly is disposed on the floor within the piece of equipment thereby being hidden from view.

In order to facilitate mounting of the housing assembly within the piece of equipment, the housing has an outwardly extending flange that is secured to the floor of the equipment, for example, by means of bolts or screws that pass through the flange into threaded engagement with the floor.

The toe assembly is threaded onto the end of the stud of the housing assembly for disposition externally of the piece of equipment.

The toe assembly has an internally threaded nut or insert threaded onto the threaded end of the stud, a cylinder fixedly secured at one end thereof to the nut in concentric relation and a cap secured in the cylinder at an open end opposite the nut to close off the cylinder.

These and other objects of the invention will become more apparent from the following description taken in conjunction with the accompanying drawings wherein:

FIG. 1 illustrates an exploded view of an adjustable equipment leg in accordance with the invention;

FIG. 2 illustrates a front view of the adjustable equipment leg of FIG. 1 in a fully extended position;

FIG. 3 illustrates a view taken on line 3-3 of FIG. 2; and

Figure 4:
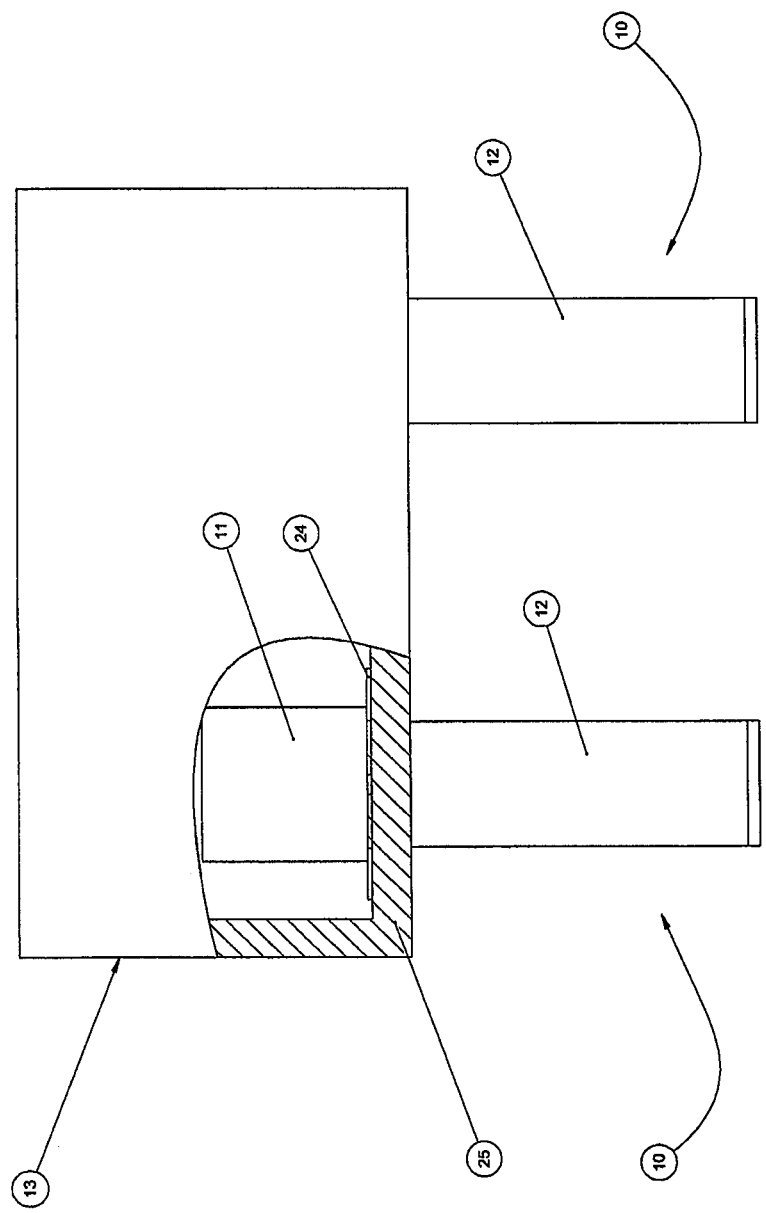
FIG. 4 illustrates a partial cross-sectional view of a piece of equipment supported on two adjustable legs in accordance with the invention.

Referring to FIGS. 1 and 2, the equipment leg 10 is comprised of a housing assembly 11 and a toe assembly 12 and is intended to be used in a vertical orientation.

The housing assembly 11 is constructed for mounting within a piece of equipment 13 (see FIG. 4) and is of cylindrical shape.

Referring to FIG. 3, the housing assembly 11 includes a housing 14 having a cylindrical chamber 15, a stud 16 concentrically disposed in and having an externally threaded end 17 projecting from the housing 14 and a retainer ring 18 concentric to the stud 16 and securing the stud 16 within the housing 14.

The housing 14 is made of a steel tubing, the stud 16 is typically metal and the retainer ring 18 is made of metal.

The retainer ring 18 has an outer wall 19 slidably mounted in the housing 14, an inner wall 20 slidably engaging the stud 16 and a planar wall 21 connecting the outer wall 19 and the inner wall 20. The retainer ring 18 is fitted into the housing 14 such that the outer wall 19 frictionally engages the inside of the housing 14 with sufficient force to prevent the ring 18 from falling out of the housing 14. In addition, the retainer rig 18 is also secured by welding (not shown) to the housing 14.

In addition, the stud 16 has a knurled outer surface 22 at an end that is fitted into the retainer ring 18 such that the inner wall 20 of the ring 18 engages the end of the stud 16 with sufficient force to prevent the stud 16 from being inadvertently pulled out of the ring 18 and the housing assembly 11. In addition, the stud 16 is also secured by welding (not shown) to the retainer ring 18.

The stud 16 also has a collar 23 that extends intermediately thereof and in abutment with the planar wall 21 of the retainer ring 18.

In order to facilitate mounting of the housing assembly 11 within the piece of equipment 13, the housing 14 has an outwardly extending flange 24 that is secured to the floor 25 of the equipment (see FIG. 4), for example, by means of bolts or screws (not shown) that pass through the flange 24 into threaded engagement with the floor 25.

The toe assembly 12 is threaded onto the end of the stud 16 of the housing assembly 11 for disposition externally of the piece of equipment.

Referring to FIG. 3, the toe assembly 12 has an internally threaded nut 26 threaded onto the threaded end of the stud 16, a cylinder 27 fixedly secured at one end thereof to the nut 26 in concentric relation and a cap 28 secured in the cylinder 27 at an end opposite the nut 26.

Typically, the cylinder 27 is made of metal, such as stainless steel, to complement the use of the equipment on which the leg is mounted.

In order to adjust the leg 10 from the fully extended position of FIG. 2 to a fully retracted position (not shown), the toe assembly 12 is manually rotated to thread upwardly on the stud 16. At this time, the cylinder 27 of the toe assembly 12 moves upwardly, as viewed, within the chamber 15 of the housing 14.

Referring to FIG. 4, wherein like reference characters indicate like parts as above, the housing 14 of the leg 10 is positioned inside the piece of equipment 13, typically on the floor 25 of the piece of equipment 13 with the flange 24 of the housing 14 seated on the floor 25.

In addition, an opening (not shown) is provided in the floor 25 coaxially of the housing 14 to allow for passage of the stud 16 and upward movement of the toe assembly 12. Likewise, a plurality of openings, e.g. 4 openings, (not shown) are provided in the floor 25 in alignment with the bolt holes 18 (not shown) in the flange 24.

The invention thus provides an improved mounting arrangement for an equipment leg and one in which the mounting arrangement is substantially concealed, particularly since the housing assembly is disposed within the piece of equipment.

What is claimed is:

1. An adjustable equipment leg comprising a housing assembly configured for within a piece of equipment, said housing assembly including a housing having a cylindrical chamber, a stud concentrically disposed in and having an externally threaded end projecting downwardly from said housing and a retainer ring concentric to said stud and securing said stud within said housing; and
   a toe assembly threaded onto said end of said stud for disposition externally of the piece of equipment, said toe assembly having an internally threaded nut threaded onto said threaded end of said stud, a cylinder fixedly secured at an upper end thereof to said nut in concentric relation and a cap secured in said cylinder at a lower end opposite said nut.

2. An adjustable equipment leg as set forth in claim 1 wherein said housing has an outwardly extending flange.

3. An adjustable equipment leg as set forth in claim 1 wherein said retainer ring has an outer wall slidably mounted in said housing, an inner wall slidably engaging said stud and a planar wall connecting said outer wall and said inner wall.

4. An adjustable equipment leg as set forth in claim 3 wherein said stud has a collar extending intermediately thereof and in abutment with said planar wall of said retainer ring.

5. In combination
   a piece of equipment having a floor; and
   a plurality of legs secured to said floor for supporting said piece of equipment on a support surface, each said leg having a housing disposed on said floor within said piece of equipment, a stud concentrically disposed in and having an externally threaded end projecting from said housing and said floor, a retainer ring concentric to said stud and securing said stud within said housing and a toe assembly threaded onto said end of said stud for disposition externally of the piece of equipment.

6. The combination of claim 5 wherein said toe assembly has an internally threaded nut threaded onto said threaded end of said stud, a cylinder fixedly secured at one end thereof to said nut in concentric relation and a cap secured in said cylinder at an end opposite said nut.

* * * * *

UNITED STATES PATENT AND TRADEMARK OFFICE
CERTIFICATE OF CORRECTION

PATENT NO. : 10,779,649 B2
APPLICATION NO. : 16/241470
DATED : September 22, 2020
INVENTOR(S) : Andrew Kamp et al.

Page 1 of 1

It is certified that error appears in the above-identified patent and that said Letters Patent is hereby corrected as shown below:

In the Specification

Column 1, Line 30, after "configured for" insert --mounting--

In the Claims

Column 3, Line 25, Claim 1 after "configured for" insert --mounting--

Signed and Sealed this
Third Day of November, 2020

Andrei Iancu
*Director of the United States Patent and Trademark Office*